July 1, 1947.　　　E. J. HOUSEKEEPER　　　2,423,239
NOZZLE ADAPTER
Filed April 22, 1946
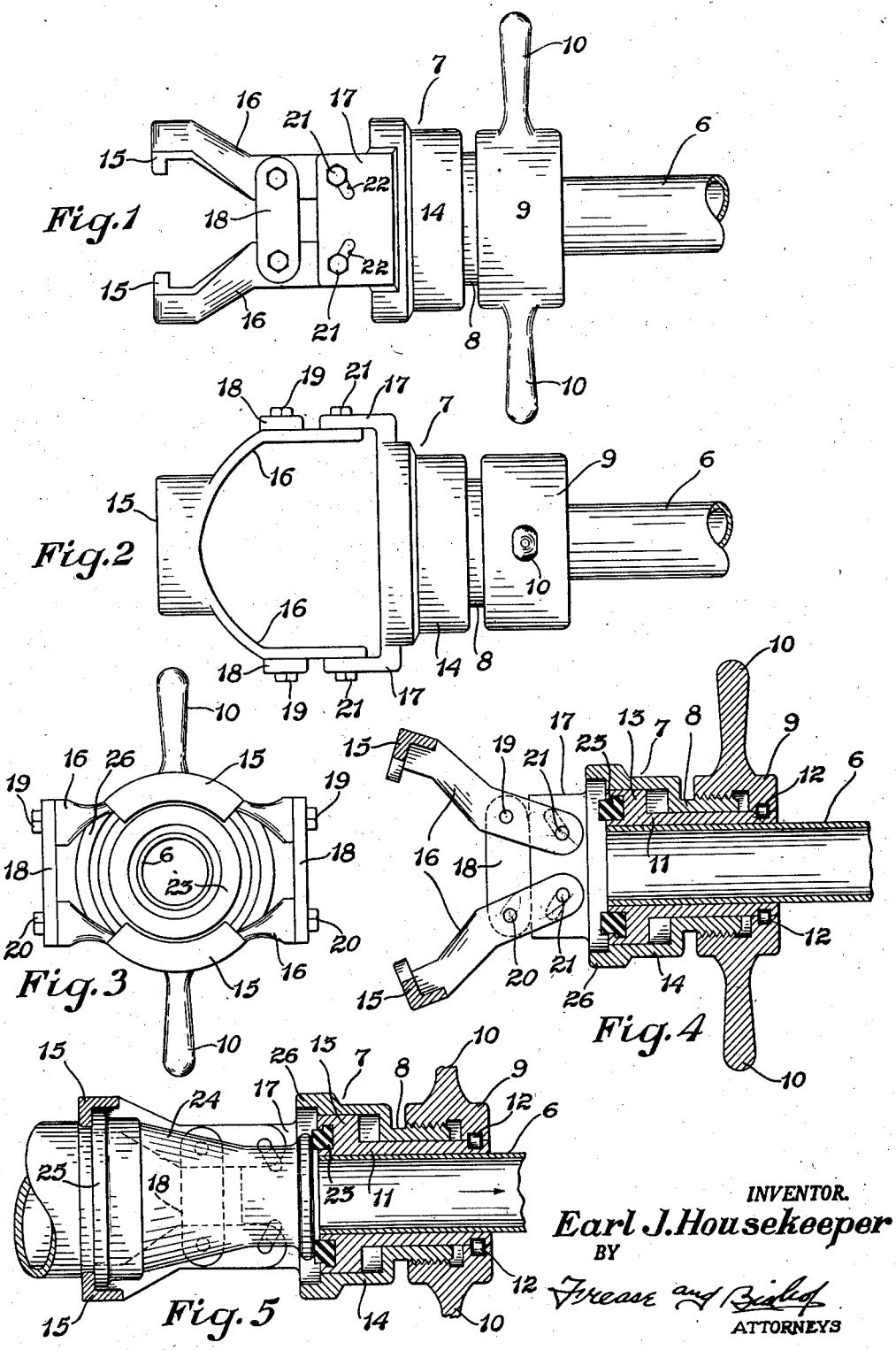
INVENTOR.
*Earl J. Housekeeper*
BY
*Frease and Bishop*
ATTORNEYS Patented July 1, 1947

2,423,239

UNITED STATES PATENT OFFICE 2,423,239

NOZZLE ADAPTER

Earl J. Housekeeper, Wooster, Ohio, assignor to The Wooster Brass Company, Wooster, Ohio, a corporation of Ohio Application April 22, 1946, Serial No. 664,049

7 Claims. (Cl. 285—171)

The invention relates generally to devices for detachably connecting an extension nozzle pipe to the end of a hose line, and more particularly to a device which adapts a fire hose shut-off nozzle for quick connection with an extension pipe or goose neck so as to substantially instantaneously adapt the hose line for fighting special types or kinds of fires.

In fire fighting, conditions often arise without warning requiring the extinguishing of fires which are difficult of access or which necessitate special nozzle tips, or both. For example, the hose line in operation may be equipped with a standard straight stream shut-off nozzle or with a fog nozzle, and suddenly it may become necessary to reach over a wall or other obstruction and direct the stream or fog onto the flames behind or within the wall, as where it is required to reach over the sides of an oil tank to gain access to flames in the tank. Under such conditions, an extension pipe or goose neck having a nozzle tip at its outer end enables directing water onto the flames without requiring the firemen holding the hose to climb up or to get too close to the flames. The extension pipe or goose neck may have a fog nozzle tip on its outer end for discharging water in the form of spray or mist, which makes it suitable for extinguishing oil fires.

The difficulty with prior constructions is that the shut-off nozzle attached to the hose first has to be removed before attaching the extension. This requires shutting off the line at the pumper, coupling the extension to the discharge end of the hose line after the nozzle is removed, and then turning on the water in the line before proceeding to quench the special type or inaccessible fire. Obviously, much important time is unavoidably lost because of this procedure in attaching the extension.

It is therefore an object of the present invention to provide novel and improved means for attaching an extension pipe directly to a shut-off nozzle.

Another object is to provide a novel adaptor for attaching an extension pipe to a variety of nozzles and nozzle tips including beaded and threaded types.

A further object is to provide a novel adaptor including improved means for positively clamping an extension pipe to a nozzle so as to make a substantially instantaneous water-tight connection.

Another object is to provide a novel adaptor having positive clamping means which is easily manipulated without tools for making a connection between an extension pipe and nozzle.

Finally, it is an object of the present invention to provide a simple and inexpensive adaptor which overcomes the disadvantages of prior constructions, and which is easily applied and operated, without requiring tools or skill.

These and other objects are accomplished by the parts, improvements, constructions and combinations comprising the present invention, a preferred embodiment of which is shown by way of example in the accompanying description; the novel elements, constructions and combinations, and reasonable mechanical equivalents thereof, being set forth in the appended claims.

In general terms, the invention may be stated as an adaptor for making a quick connection between a hose nozzle and an extension pipe, said adaptor including a body member having threaded engagement at one end with a hand swivel in which is journaled an inner thrust sleeve connected to the extension and axially movable in the body member, there being a sealing gasket at the other end of the sleeve for abutting the end of a nozzle tip to make a water-tight connection between the tip and the sleeve, and clamping jaws mounted on the body member for swinging movement toward each other to engage behind a collar or flange on the nozzle and axially spaced from the end of the nozzle tip.

Referring to the drawing forming part hereof, in which a preferred embodiment of the invention is shown by way of example, Figure 1 is a side elevation of the improved adaptor attached to the inner end of an extension pipe, showing the jaws in closed position;

Fig. 2 is a top plan elevation thereof;

Fig. 3 is an end elevation thereof, looking toward the jaws of the adaptor;

Fig. 4 is a longitudinal sectional view of the improved adaptor, showing the jaws in open position; and Fig. 5 is a similar view showing the jaws clamped around a nozzle to connect the same to the extension pipe.

Similar numerals refer to similar parts throughout the several views of the drawing.

In the drawing, the inner end portion of an extension pipe is shown at 6, it being understood that the outer end of the extension pipe may be a goose neck terminating in a nozzle tip, which may be spray head or any one of a variety of straight stream or fog nozzle tips. The inner end of the extension pipe 6 is detachably connected to the improved adaptor comprising the present invention, and as shown in Figs. 4 and 5 may be telescoped therein with a friction fit, although it may be otherwise attached to the adaptor within the scope of the invention.

The novel adaptor preferably includes a body member indicated generally at 7, and may be of stepped cylindrical shape with its smallest portion or neck 8 at the forward or extension pipe side of the body. The neck 8 is provided with exterior screw threads on which is screwed a swivel 9, and the swivel 9 is preferably hand operated and provided with diametrically opposite handles 10 for that purpose.

A thrust sleeve 11 is journaled in the swivel 9 by means of a series of rollers 12 which are carried in registering raceway grooves formed in the swivel and in the sleeve 11. The sleeve 11 is longitudinally slidable within the neck 8 of the body member, and at its rear end the sleeve is provided with an enlarged annular collar portion 13 which is slidable in the enlarged cylindrical portion 14 of the body. The rear end of the extension pipe 6 is preferably telescoped within the sleeve 11 so as to have a friction fit therewith.

Accordingly, when the swivel 9 is rotated it will move toward the enlarged portion 14 of the body member while rotating on the rollers 12 with respect to the thrust sleeve 11. This axial movement of the swivel rearwardly will carry with it the thrust sleeve 11 and move the rear end 13 thereof rearwardly with respect to the body member, or to the left as viewed in Figs. 4 and 5.

The pair of clamping jaws for engaging behind a collar or flange on a hose nozzle to clamp the same to the adaptor, preferably include arcuate clamping portions 15 at their rear ends for engaging diametrically opposite portions of the nozzle. Each jaw has outwardly and forwardly angled arms 16 at opposite sides which are connected at their forward ends to L-shaped brackets 17 extending rearwardly from the body member 7 at diametrically opposite portions thereof. As will be seen in the drawings, each angle bracket 17 is connected to two of the arms 16, one extending rearwardly from each clamping jaw 15.

As best shown in Figs. 1 and 4, the rear ends of the arms 16 have pin and slot connections with the angle brackets 17 which allows the jaws to swing toward and away from each other. The arms 16 of opposite jaws are connected together by links 18, the arms being pivoted at intermediate portions to the ends of the links 18 to provide pivots 19 and 20 about which the jaws 15 swing.

As best shown in Figs. 1 and 4, the forward ends of the arms 16 have pins or bolts 21 which are slidably received in slots 22 in the brackets 17 and the slots are inclined rearwardly so that the jaws are moved rearwardly a slight distance during their closing movement.

When the adaptor is applied to the end of a nozzle for connecting the extension pipe 6 thereto, the nozzle tip is brought into abutment with the rear end of the thrust sleeve 11, and in order to make a water-tight seal at that point, an annular gasket 23 is located in the rear end of the portion 13 for abutting the nozzle tip. As shown the nozzle may be a conventional straight-stream nozzle as indicated at 24 in Fig. 5, or it may be a shut-off nozzle including several types of straight stream or combination stream and fog nozzles.

In any event, the front end of the nozzle is adapted to abut the gasket 23 in the manner shown in Fig. 5 to provide a water-tight connection between the nozzle and the extension pipe 6, and the jaws 15 are adapted to engage behind an annular flange 25 on the nozzle, which flange may be at the opposite end of the nozzle or at an intermediate portion thereof, depending upon the type and kind of nozzle being used. The rear end of the body member 7 is preferably enlarged radially as indicated at 26 for engirdling nozzle tips of larger diameter or the usual protective rubber cushion sleeve provided on certain types of nozzles.

In the operation of the improved adaptor, for making a quick connection between the extension pipe 6 and a nozzle such as 24, the end of the nozzle is brought into abutment with gasket 23 while the jaws are in open position as in Fig. 4, and the jaws are then moved by hand toward closed position behind a flange such as 25 on the nozzle. While the jaws are held in this position, a quick turn on the swivel 9 will exert a rearward axial thrust on the thrust sleeve 11 which will transmit a rearward thrust through the nozzle to the jaws 15. This rearward thrust will move the pins 21 upwardly and rearwardly in the slots 22 and force the jaws toward each other into tight engagement with the nozzle. The whole operation can be done almost instantaneously by an unskilled person, and does not require any tools of any kind whatsoever.

If the nozzle 24 is a shut-off nozzle which incorporates a shut-off valve, the water in the hose line need only be shut off momentarily while the adaptor is positioned and immediately clamped in place on the end of the nozzle, so that if a shut-off nozzle is in normal operation, and an inaccessible or special type of fire is encountered, the extension pipe is quickly coupled to the nozzle and in operation within a few seconds, and as soon as the extension pipe is no longer needed, it is just as quickly disconnected and the shut-off nozzle again put in operation.

The improved adaptor is suitable for making quick connection with a variety of nozzle and nozzle tips, because the annular gasket 23 will provide a water-tight connection wtih varying sizes of nozzles, and the jaws 15 will positively clamp behind flanges of varying diameter.

Moreover, the novel adaptor has a minimum number of parts and is extremely simple and inexpensive to manufacture, operate, and maintain.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the invention, the construction, the operation and use, and preferred embodiments thereof, and the advantageous new and useful results obtained thereby; the new and useful constructions and reasonable mechanical equivalents thereof obvious to those skilled in the art, are set forth in the appended claims.

I claim:

1. An adaptor for detachably connecting an extension pipe to a hose nozzle, including a thrust sleeve on the extension having a gasket at its rear end for making a water-tight abutment with the end of the nozzle, a body member slidable on said thrust sleeve, a swivel journaled on the forward end of said thrust sleeve and screwed on the forward end of said body member, and a pair of jaws pivotally connected together for clamping behind a flange on the nozzle and mounted on the rear end of said body member for limited rearward movement during their clamping action.

2. An adaptor for detachably connecting an extension pipe to a hose nozzle, including a thrust sleeve on the extension having a gasket at its rear end for making a water-tight abutment with the end of the nozzle, a body member slidable on said thrust sleeve, a swivel journaled on the forward end of said thrust sleeve and screwed on the forward end of said body member, and clamping jaws extending rearwardly from said body member and movable toward each other for closing around a nozzle, the front ends of said jaws having pin and slot connections with said body member for moving the jaws rearwardly during their closing movement.

3. An adaptor for detachably connecting an extension pipe to a hose nozzle, including a thrust sleeve on the extension having a gasket at its rear end for making a water-tight abutment with the end of the nozzle, a body member slidable on said thrust sleeve, a swivel journaled on the forward end of said thrust sleeve and screwed on the forward end of said body member, clamping jaws extending rearwardly from said body member, and links pivotally connecting intermediate portions of said jaws, the front ends of said jaws having pin and slot connections with said body member for moving the jaws rearwardly as they pivot toward each other.

4. An adaptor for connecting an extension pipe to a hose nozzle, including a body member, a thrust sleeve connected to the extension pipe slidable in said body member and projecting forwardly beyond the end thereof, a swivel journaled on the projecting end of said sleeve and screwed on the body member, and clamping jaws for clamping around a nozzle abutting the rear end of said thrust sleeve, said jaws being mounted on said body member for limited rearward movement during their closing movement.

5. An adaptor for connecting an extension pipe to a hose nozzle, including a body member, a thrust sleeve connected to the extension pipe slidably mounted in said body member, means for manually moving the sleeve longitudinally of the body member, and clamping jaws movable toward and away from each other for engaging a nozzle positioned with its front end abutting the rear end of said sleeve, said jaws being mounted on said body member for limited rearward movement during their closing movement.

6. An adaptor for connecting an extension pipe to a hose nozzle including a body member, a thrust sleeve connected to the extension pipe slidably mounted in said body member, means for manually moving the sleeve longitudinally of the body member, and a pair of jaws pivotally connected together for clamping a nozzle with its front end abutting the rear end of said sleeve, said jaws being mounted on the rear end of said body member for limited rearward movement during their pivotal closing movement.

7. An adaptor for connecting an extension pipe to a hose nozzle, including a body member, a thrust sleeve connected to the extension pipe slidably mounted in said body member, means for manually moving the sleeve longitudinally of the body member, clamping jaws extending rearwardly from said body member, and links pivotally connecting intermediate portions of said jaws for swinging movement thereof, the front ends of said jaws having movable connections with said body member permitting limited rearward movement of the jaws during their closing movement.

EARL J. HOUSEKEEPER.